(12) United States Patent
Eshraghi et al.

(10) Patent No.: US 8,048,584 B2
(45) Date of Patent: Nov. 1, 2011

(54) FUEL CELL STRUCTURES AND ASSEMBLIES

(75) Inventors: Ray R. Eshraghi, Cary, NC (US);
Michael W. Riley, Morrisville, NC (US)

(73) Assignee: Microcell Corporation, Raleigh, NC (US)

( * ) Notice: Subject to any disclaimer, the term of this patent is extended or adjusted under 35 U.S.C. 154(b) by 1046 days.

(21) Appl. No.: 11/750,990

(22) Filed: May 18, 2007

(65) Prior Publication Data
US 2007/0243439 A1    Oct. 18, 2007

Related U.S. Application Data

(62) Division of application No. 10/794,687, filed on Mar. 5, 2004, now Pat. No. 7,229,712.

(60) Provisional application No. 60/452,635, filed on Mar. 7, 2003.

(51) Int. Cl.
*H01M 8/24* (2006.01)
*H01M 2/40* (2006.01)

(52) U.S. Cl. .......................... 429/452; 429/457; 429/466

(58) Field of Classification Search .................. 429/452, 429/457, 466
See application file for complete search history.

(56) References Cited

U.S. PATENT DOCUMENTS

| | | | |
|---|---|---|---|
| 4,659,637 | A | 4/1987 | Nelson et al. |
| 5,171,735 | A | 12/1992 | Chien |
| 5,492,782 | A | 2/1996 | Higley |
| 5,529,855 | A | 6/1996 | Watanabe |
| 5,916,514 | A | 6/1999 | Eshraghi |
| 5,925,470 | A | 7/1999 | Blanyer et al. |
| 5,928,808 | A | 7/1999 | Eshraghi |
| 5,989,300 | A | 11/1999 | Eshraghi |
| 6,004,691 | A | 12/1999 | Eshraghi |
| 6,042,958 | A | 3/2000 | Denton et al. |
| 6,113,722 | A | 9/2000 | Hoffman et al. |
| 6,338,913 | B1 | 1/2002 | Eshraghi |
| 6,399,232 | B1 | 6/2002 | Eshraghi |
| 6,403,248 | B1 | 6/2002 | Eshraghi |
| 6,403,517 | B1 | 6/2002 | Eshraghi |
| 6,444,339 | B1 | 9/2002 | Eshraghi |

(Continued)

FOREIGN PATENT DOCUMENTS

JP          57-040867 A    3/1982

(Continued)

OTHER PUBLICATIONS

Unpublished U.S. Appl. No. 12/349,483, filed Jan. 6, 2009.

*Primary Examiner* — Karie O'Neill Apicella
(74) *Attorney, Agent, or Firm* — Steven J. Hultquist; Hultquist IP (57) ABSTRACT

The present invention relates to microfibrous fuel cell sub-bundle structures, fuel cell bundles and fuel cell assemblies formed by such fuel cell sub-bundles and bundles. Specifically, a fuel cell sub-bundle is provided, which comprises multiple microfibrous fuel cells. Each microfibrous fuel cell comprises: (a) a hollow microfibrous membrane separator comprising an electrolyte medium, (b) an inner electrocatalyst layer in contact with an inner surface of such membrane separator, (c) an outer electrocatalyst layer in contact with an outer surface of such membrane separator, and (d) an individual current collector in electrical contact with the inner surface of such membrane separator. Each of such multiple microfibrous fuel cells is in electrical contact with a common current collector at the outer surface of its membrane separator.

9 Claims, 8 Drawing Sheets

U.S. PATENT DOCUMENTS

| | | | |
|---|---|---|---|
| 6,495,281 B1 * | 12/2002 | Eshraghi | 429/452 |
| 6,667,099 B1 | 12/2003 | Greiner et al. | |
| 7,229,712 B2 | 6/2007 | Eshraghi et al. | |
| 7,422,813 B2 | 9/2008 | Eshraghi et al. | |
| 2004/0005498 A1 | 1/2004 | Eshraghi | |
| 2004/0058224 A1 | 3/2004 | Eshraghi et al. | |
| 2004/0142101 A1 | 7/2004 | Eshraghi et al. | |
| 2004/0175605 A1 | 9/2004 | Eshraghi et al. | |
| 2004/0191588 A1 | 9/2004 | Eshraghi et al. | |
| 2004/0197557 A1 | 10/2004 | Eshraghi et al. | |
| 2004/0219421 A1 | 11/2004 | Eshraghi | |
| 2005/0181269 A1 | 8/2005 | Eshraghi et al. | |
| 2006/0118994 A1 | 6/2006 | Eshraghi et al. | |
| 2009/0130511 A1 | 5/2009 | Eshraghi et al. | |
| 2009/0130512 A1 | 5/2009 | Eshraghi et al. | |

FOREIGN PATENT DOCUMENTS

| | | | |
|---|---|---|---|
| JP | H02-168566 A | | 6/1990 |
| JP | 03-044454 A | | 2/1991 |
| JP | 03-047617 A | | 2/1991 |
| JP | H04-280809 A | | 10/1992 |
| JP | H05-003035 A | | 1/1993 |
| JP | 05-039587 A | | 2/1993 |
| JP | H05-331701 A | | 12/1993 |
| JP | H06-036776 A | | 2/1994 |
| JP | 08-138700 A1 | | 5/1996 |
| JP | 9223507 A | | 8/1997 |
| JP | 09223507 A | * | 8/1997 |
| JP | H10-266014 A | | 10/1998 |
| JP | 2002-124273 A | | 4/2002 |

* cited by examiner

FUEL CELL STRUCTURES AND ASSEMBLIES

CROSS-REFERENCE TO RELATED APPLICATIONS

This application is a divisional and claims priority under 35 USC 120 of U.S. patent application Ser. No. 10/794,687 filed Mar. 5, 2004, now U.S. Pat. No. 7,229,712, which in turn claims the benefit of priority under 35 USC 119 of U.S. Provisional Patent Application No. 60/452,635 filed Mar. 7, 2003. Both of said applications are incorporated herein by reference in their respective entireties, for all purposes.

GOVERNMENT INTEREST

The U.S. government may own rights in the present invention, pursuant to Grant No. 70NANB1H3039 awarded by the Advanced Technology Program (ATP) of National Institute of Science and Technology (NIST).

BACKGROUND OF THE INVENTION

1. Field of the Invention

This invention in general relates to fuel cell structures and assemblies, and more specifically to fuel cell structures and assemblies that comprise multiple microfibrous fuel cell elements arranged and constructed for efficient thermal and/or humidity management.

2. Description of the Related Art

In recent years, fuel cell or fuel cell assembly has become more and more available as a power source for use in handheld or mobile electrical devices, electrically powered vehicles, as well as in distributed power generation applications.

Fuel cells offer especially attractive prospects as energy conversion devices, by exhibiting high energy efficiency and low levels of gaseous/solid emissions, in comparison with traditional combustion-based energy sources.

In addition to generation of electrical energy, fuel cells convert a portion of the chemical energy stored in the fuel into heat during the electrochemical reaction, which, if efficiently collected and utilized, will significantly increase the overall energy (electrical+thermal) efficiency of the fuel cell systems. Therefore, there is an on-going interest in developing fuel cell systems as cogeneration systems for both electrical and thermal energy, to increase efficiency of such systems. The thermal energy produced by such cogeneration systems can be used for both heating and cooling (by using absorption or adsorption chiller or desiccant cooling), to support adjacent industrial facilities and domestic residences.

The thermal energy managing devices or structures used in conventional fuel cell cogeneration systems are usually very bulky in size, which include various heat exchanging panels, pipes, fluid pumps, and tubings, for which significant space is required, in additional to that of the fuel cell itself. There is therefore a need to provide a compact fuel cell system with thermal energy collecting/transferring components that are space-saving in character.

Further, in proton exchange membrane (PEM) fuel cells wherein continuous flow of feed (such as hydrogen or methanol) and oxidant (such as air or oxygen) is required for the electrochemical reactions therein, the feed or the oxidant stream needs to be sufficiently humidified to prevent drying of the membrane separators in the fuel cells. Humidifying devices or structures, such as water tanks, pumps, tubings and control devices, are therefore necessary for supplying water or water vapor to the fuel cell systems, in order to maintain the electrochemical reaction rate and the energy output density. Such humidifying devices or structures further increase the size of the fuel cell system. It will therefore be advantageous to provide a compact fuel cell system with reliable humidifying components having space-saving characteristics.

A recent innovation in the fuel cell industry is the development of microfibrous fuel cells, as described in details in U.S. Pat. Nos. 5,916,514; 5,928,808; 5,989,300; 6,004,691; 6,338,913; 6,399,232; 6,403,248; 6,403,517; 6,444,339; 6,495,281; all to Ray R. Eshraghi. Such microfibrous fuel cells are shaped as elongated fibers with very small cross-sectional diameters (ranging from a few hundred microns to a few millimeters), and can be serially and/or parallelly arranged, interconnected, and packed into compact fuel cell assemblies of very high voltage and power densities.

For thermal management in such microfibrous fuel cell assemblies, Eshraghi patents disclose use of hollow, fibrous heat exchanging tubes, which are packed side by side with the microfibrous fuel cells, and through which a coolant medium is passed for removing heat out of such fuel cell assemblies.

Eshraghi patents further disclose that such hollow, fibrous heat exchange tubes may comprise a water-permeable porous membrane wall, so that water deriving from an aqueous coolant medium permeates from the bores of such heat exchange tubes through the membrane wall into the feed stream, thereby humidifying the electrochemical reaction environment.

Therefore, the Eshraghi patents provide a compact fuel cell assembly with an integrated thermal and humidity management structure.

The present invention improves the thermal and/or humidity management efficiency in the Eshraghi fuel cell assembly, and advances the Microcell™ technology in the aspect of electrical and thermal energy cogeneration.

Other objects of the present invention will be more fully apparent from the ensuing disclosure and appended claims.

SUMMARY OF THE INVENTION

The present invention in one aspect relates to a fuel cell sub-bundle, which comprises multiple microfibrous fuel cells, wherein each microfibrous fuel cell comprises: (a) a hollow microfibrous membrane separator comprising an electrolyte medium, (b) an inner electrocatalyst layer in contact with an inner surface of such membrane separator, (c) an outer electrocatalyst layer in contact with an outer surface of such membrane separator, and (d) an individual current collector in electrical contact with the inner surface of such membrane separator, and wherein each of the multiple microfibrous fuel cells is in electrical contact with a common current collector at the outer surface of its membrane separator.

Preferably but not necessarily, such common current collector has a fibrous conformation, around which the multiple microfibrous fuel cells can be arranged to form a fibrous or tubular sub-bundle structure.

Another aspect of the present invention relates to a fuel cell structure comprising multiple fuel cell elements and a common current collector, wherein each fuel cell element comprises (1) a membrane separator having an electrolyte medium, (2) a first electrocatalyst layer in electrical contact with a first surface of the membrane separator, (3) a second electrocatalyst layer in electrical contact with a second, opposite surface of the membrane separator, and (4) an individual current collector in electrical contact with the first surface of the membrane separator, wherein each fuel cell element is in electrical contact with the common current collector at the second, opposite surface of its membrane separator.

A further aspect of the present invention relates to a fuel cell bundle comprising a thermally conductive tubular element and one or more fuel cell sub-bundles positioned therein, wherein each fuel cell sub-bundle comprises multiple microfibrous fuel cells all in electrical contact with a common current collector, wherein each microfibrous fuel cell comprises: (a) a hollow microfibrous membrane separator comprising an electrolyte medium, (b) an inner electrocatalyst layer in contact with an inner surface of the membrane separator, (c) an outer electrocatalyst layer in contact with an outer surface of the membrane separator, and (d) an individual current collector in electrical contact with the inner surface of the membrane separator.

A still further aspect of the present invention relates to a fuel cell bundle comprising one or more microfibrous fuel cell elements disposed inside an air channel tube, each microfibrous fuel cell element comprising:
 (a) an inner current collector;
 (b) an inner electrocatalyst layer;
 (c) a hollow fibrous membrane separator comprising an electrolyte medium;
 (d) an outer electrocatalyst layer; and
 (e) optionally an outer current collector.

Still another aspect of the present invention relates to a fuel cell assembly, which comprises an assembly of the above-described fuel cell bundles positioned in a housing, wherein such housing comprises multiple leak-tightly separated compartments and multiple fluid inlets and outlets for separately passing a fuel-containing fluid, an oxidant-containing fluid, and a heat-exchange fluid through the fuel cell bundles for generation of electrical and thermal energy.

A still further aspect of the present invention relates to a fuel cell assembly comprising an elongated housing structure having a longitudinal axis with one or more fuel cell elements placed therein, wherein said elongated housing structure comprises multiple fluid inlets and outlets for separately passing two or more fluids through the fuel cell elements, and wherein all the fluid inlets and outlets of said elongated housing structure are substantially parallel to the longitudinal axis of said elongated housing.

Other aspects, features and advantages of the invention will be more fully apparent from the ensuing disclosure and appended claims.

DETAILED DESCRIPTION OF THE INVENTION AND PREFERRED EMBODIMENTS THEREOF

The contents of U.S. Pat. Nos. 5,916,514, 5,928,808, 5,989,300, 6,338,913, 6,399,232, 6,403,248, 6,403,517, 6,444,339, 6,495,281, and U.S. Provisional Patent Application No. 60/452,635, filed Mar. 7, 2003 are incorporated herein by reference in their entireties for all purposes.

The terms "microfibrous," "fibrous," and "fiber" are used interchangeably herein for defining an elongated structure having a cross-sectional outer diameter in a range of from about 10 microns to about 10 millimeters, preferably 100 microns to about 10 millimeters, more preferably from about 10 microns to about 5 millimeters, and most preferably from about 10 microns to about 1 millimeter.

The terms "tubular" and "tube" are used herein for defining an elongated structure having a cross-sectional outer diameter of at least one millimeter, preferably at least 1 centimeter, and more preferably at least 5 centimeters.

The terms "porous" and "microporous" are used interchangeably herein for defining structures having pore size ranging from 1 Angstrom to about 10 microns.

Fuel Cell Sub-Bundle

The present invention in one aspect provides a novel fuel cell sub-bundle structure, which comprises multiple fuel cell elements that share a common current collector. Each fuel cell element comprises a porous or non-porous membrane separator having an electrolyte medium therein. The membrane separator defines a first surface and a second, opposite surface. A first and a second electrocatalyst layers are provided at the respective first and second surfaces of such membrane separator to facilitate electrochemical reactions. An individual current collector is provided for each fuel cell element at the first surface of each membrane separator, while the common current collector electrically contacts all of the fuel cell elements at the second, opposite surfaces of their membrane separators.

In a preferred embodiment of the present invention, the fuel cell elements comprise multiple hollow microfibrous membrane separators that are in electrical contact with multiple individual current collectors at inner surfaces thereof and a common fibrous or tubular current collector at outer surfaces thereof.

Figure 1:
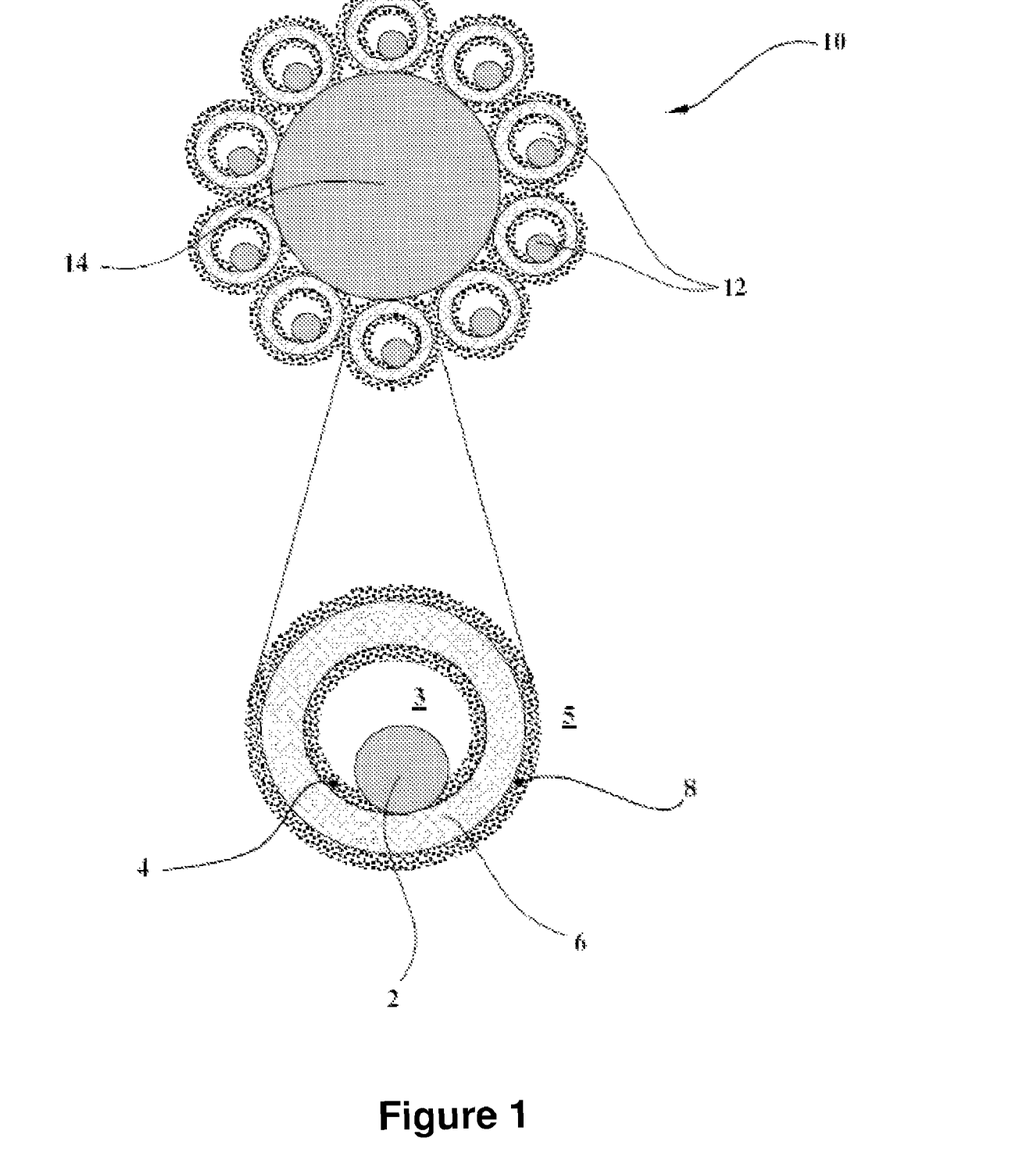
FIG. 1 is a transverse cross-sectional view of a fuel cell sub-bundle comprising multiple microfibrous fuel cell elements surrounding and in contact with a common outer current collector, according to one embodiment of the present invention.

FIG. 1 illustrates an exemplary fuel cell sub-bundle structure 10, according to one embodiment of the present invention. Such fuel cell sub-bundle 10 comprises multiple microfibrous fuel cell elements 12 that are in electrical contact with a common outer current collector 14.

As shown in the lower portion of FIG. 1, each microfibrous fuel cell element 12 comprises a hollow microfibrous membrane separator 6 having an electrolyte medium therein. The hollow microfibrous membrane separator 6 defines a bore side 3 and a shell side 5. An inner electrocatalyst layer 4 and an individual current collector 2 are provided at the bore side of the membrane separator 6 in electrical contact with its inner surface, and an outer electrocatalyst layer 8 is provided at the shell side of the membrane separator 6 in electrical contact with its outer surface. Further, a lumen is provided at the bore side 3 of the membrane separator 6 so that a fuel-containing fluid (or alternatively, an oxidant-containing fluid) can be passed through the bore of the fuel cell element 12, while the shell of such fuel cell element 12 is exposed to an oxidant-containing fluid (or alternatively, a fuel-containing fluid).

The hollow fibrous membrane separator 6 may comprise either a liquid electrolyte medium or a solid electrolyte medium. Such hollow fibrous membrane separator may be microporous, with liquid or solid electrolyte medium impregnated in micropores of such membrane separator. Alternatively, such hollow fibrous membrane separator is itself a solid ion-exchange membrane, which consists essentially of either a solid ion-exchange ceramic material or a solid ion-exchange polymeric material, and which functions both as the membrane matrix for providing structural support and the electrolyte medium for carrying out the electrochemical reaction. Preferably, the membrane separator comprises a solid ion-exchange polymer (i.e., either a cationic exchange polymer or an anionic exchange polymer) selected from the group consisting of perflurocarbon-sulfonic-acid-based polymers, polysulfone-based polymers, perfluorocarboxylic-acid-based polymers, styrene-vinyl-benzene-sulfonic-acid-based polymers, and styrene-butadiene-based polymers. Examples of ion-exchange polymeric membrane suitable for use in the present invention include the Nafion® membrane manufactured by DuPont at Fayetteville, N.C.; the Flemion® membrane manufactured by Asahi Glass Company at Tokyo, Japan; and the Aciplex® membrane manufactured by Asahi Chemical Company at Osaka, Japan.

The common outer current collector 14 is preferably a fibrous or tubular element, around which the multiple microfibrous fuel cell elements 12 can be firmly packed, or otherwise assembled, to form a compact fuel cell sub-bundle 10 with improved structural stability. In a specific embodiment, such common current collector comprises a solid (i.e., devoid of cavity) fibrous or tubular element. In an alternative embodiment of the present invention, it comprises a hollow fibrous or tubular element with a central cavity therein, and a heat-exchanging fluid can be passed therethrough to remove the heat generated by the multiple fuel cell elements.

The common current collector 14 may comprise any suitable electrically conductive materials and mixtures thereof, including but not limited to carbon, graphite, carbon fiber- or fiberglass-reinforced materials, metals, metal alloys, electrically conductive polymers, polymeric composites, and electrically conductive ceramics, etc. Preferably, the common current collector comprises metal or metal alloy, including but not limited to: titanium, niobium, nickel, zirconium, gold, tantalum, platinum, palladium, silver, and alloys thereof. More preferably, a metal clad composite having two or more metal layers bonded together by solid-phase bonding is employed for forming the thermally conductive tube. Specifically, the metal clad composite comprises an outermost layer formed of corrosion-resistant metal or metal alloy, such as titanium, niobium, nickel, zirconium, gold, tantalum, platinum, palladium, silver, and alloys thereof, and one or more inner layers comprising metal or metal alloy of higher conductivity and/or lower costs, such as copper, aluminum, brass, bronze, nickel, silver, and alloys thereof. More description for metal clad composites is provided in U.S. patent application Ser. No. 10/188,471 filed on Jul. 2, 2002 for "MICROCELL ELECTROCHEMICAL DEVICES AND ASSEMBLIES WITH CORROSION-RESISTANT CURRENT COLLECTORS, AND METHOD OF MAKING THE SAME," and issued Apr. 6, 2005 as U.S. Pat. No. 6,884,539, the content of which is incorporated herein by reference in its entirety for all purposes.

Figure 2:
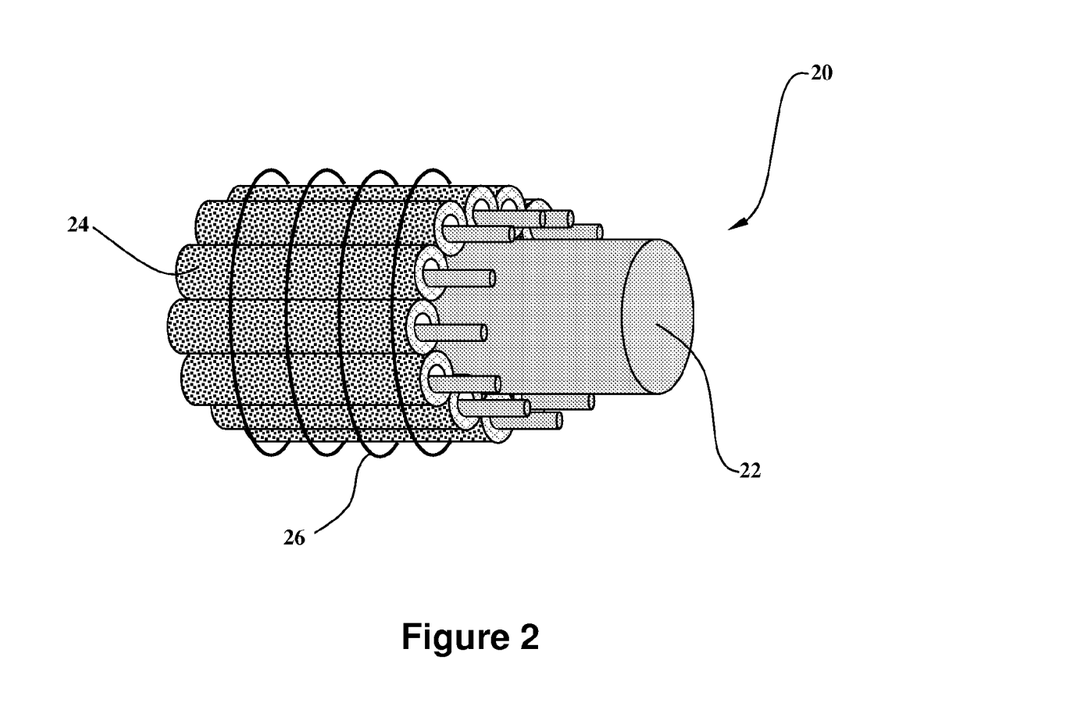
FIG. 2 is a perspective partial view of a fuel cell sub-bundle comprising multiple microfibrous fuel cell elements surrounding and in contact with a tubular common outer current collector, according to one embodiment of the present invention.

FIG. 2 shows a perspective partial view of another fibrous fuel cell sub-bundle 20 that comprises multiple microfibrous fuel cells 24 wound around a common current collector 22 by a wrapping element 26, according to one embodiment of the present invention. An optional insulating layer may be provided to cover the end portion of the common current collector 22 and to prevent electrical shorting between the inner and outer current collectors.

Figure 3:
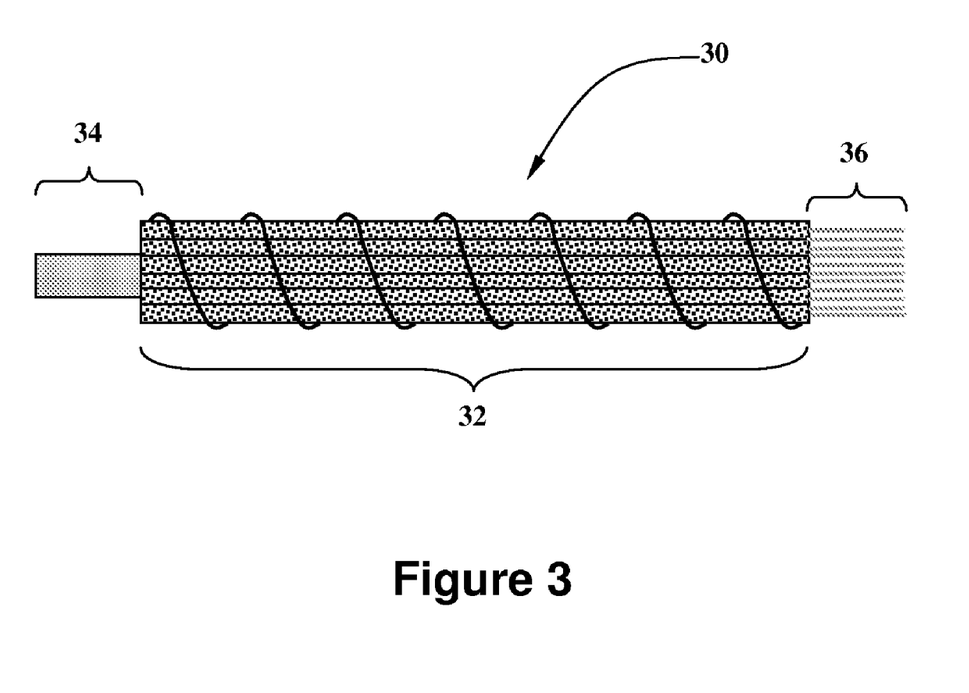
FIG. 3 is a side view of a fuel cell sub-bundle comprising multiple microfibrous fuel cell elements surrounding and in contact with a tubular common outer current collector, according to one embodiment of the present invention.

FIG. 3 shows a longitudinal side view of still another fuel cell sub-bundle 30, according to another embodiment of the present invention. Such fuel cell sub-bundle comprises a central portion 32, a first terminal 34 at one end of the central portion 32, and a second, opposite terminal 36 at the other end of the central portion 32.

The membrane separators of the microfibrous fuel cell elements contained by such fuel cell sub-bundle 30 extend through the central portion 32 and terminate respectively at the first and second terminals 34 and 36. The common current collector 22 extends beyond the central portion 32 into the first terminal 34 to provide a first electrical contact (either positive or negative) for the fuel cell sub-bundle 20, while the individual current collectors of the multiple microfibrous fuel cells contained by such fuel cell sub-bundle 30 extend beyond the central portion 32 into the second terminal 36. Such individual current collectors can be interconnected to provide a second electrical contact (either negative or positive) that is isolated from the first electrical contact of the fuel cell sub-bundle 30. In this specific embodiment, the multiple microfibrous fuel cells contained in the fuel cell sub-bundle 30 are parallelly interconnected with one another to provide increased current output.

The fuel cell sub-bundle structure 30 can be potted at both ends of the central portion 30 near the first and second terminals 34 and 36 to isolate and seal the bore sides of the multiple microfibrous fuel cell elements from the shell sides thereof, as disclosed in U.S. Pat. Nos. 5,916,514, 5,928,808, 5,989,300, 6,338,913, 6,399,232, 6,403,248, 6,403,517, 6,444,339, and 6,495,281. Alternatively, multiple fuel cell sub-bundles as described hereinabove can be packed together and potted at both ends thereof, to form a fuel cell core structure, which is described in further details hereinafter.

While the above-provided examples of fuel cell sub-bundles are primarily directed to microfibrous fuel cells, it will be appreciated that the description is generally applicable to any types of fuel cells, including the flat or planar fuel cells and fuel cells of any other configuration well known in the field of art. For example, the fuel cell elements may comprise multiple flat or planar membrane separators that are in electrical contact with multiple individual current collectors at first sides thereof and a common flat or planar current collector at second, opposite sides thereof; alternatively, such fuel cell elements may comprise multiple tubular or cylindrical membrane separators that are in electrical contact with multiple individual current collectors at inner surfaces thereof and a common tubular or cylindrical current collectors at outer surfaces thereof.

Another aspect of the present invention relates to a fuel cell sub-bundle structure that comprises multiple microfibrous fuel cell elements that share a common heat-exchanging and/or humidifying element, wherein each microfibrous fuel cell element comprises (a) an inner current collector; (b) a hollow fibrous membrane separator comprising an electrolyte medium; (c) an inner electrocatalyst layer; (d) an outer electrocatalyst layer, and (e) an outer current collector.

The structure of such fuel cell sub-bundle is similar to those illustrated in FIGS. 1-3, except that the central tubular element around which the multiple fuel cell elements are arranged is not a common current collector but a hollow tubular heat-exchanging and/or humidifying element comprising an electrically non-conductive/thermally conductive material, and that each microfibrous fuel cell contains additional individual outer current collectors, rather than sharing a common outer current collector. Such heat-exchanging and/or humidifying element may comprise a non-porous, hydrophilic or microporous, hydrophobic membrane wall that allows water or water vapor to permeate therethrough to humidify the surrounding microfibrous fuel cells.

The fuel cell sub-bundles as described hereinabove may be covered with a thin layer of porous, insulating material. Such porous insulating layer prevents electrical shorting between adjacent fuel cell sub-bundles when serially connected, but allows diffusion of fuel or oxidant fluid therethrough to contact the outer electrocatalyst layer of each microfibrous fuel cell in the sub-bundles. The porous insulating layer may comprise, for example, a porous fiberglass matrix, a porous polymeric matrix with a foam-like structure (e.g., a polyurethane foam layer), or an insulating mesh. Preferably, the porous insulating layer comprises one or more hydrophobic materials.

Fuel Cell Bundle with Heat Exchange Tubes

Another aspect of the present invention relates to a fuel cell bundle comprising a thermally conductive tubular element having one or more fuel cell sub-bundles placed therein.

The thermally conductive tubular element functions as a heat exchange tube for conducting the heat generated by the fuel cell sub-bundles therein to a heat-exchanging fluid that is in contact with its outer surface, thereby removing excessive heat from the fuel cell sub-bundles and reducing damage of the fuel cell elements due to overheating. Further, it provides additional structural support to the fuel cell sub-bundles.

Figure 4:
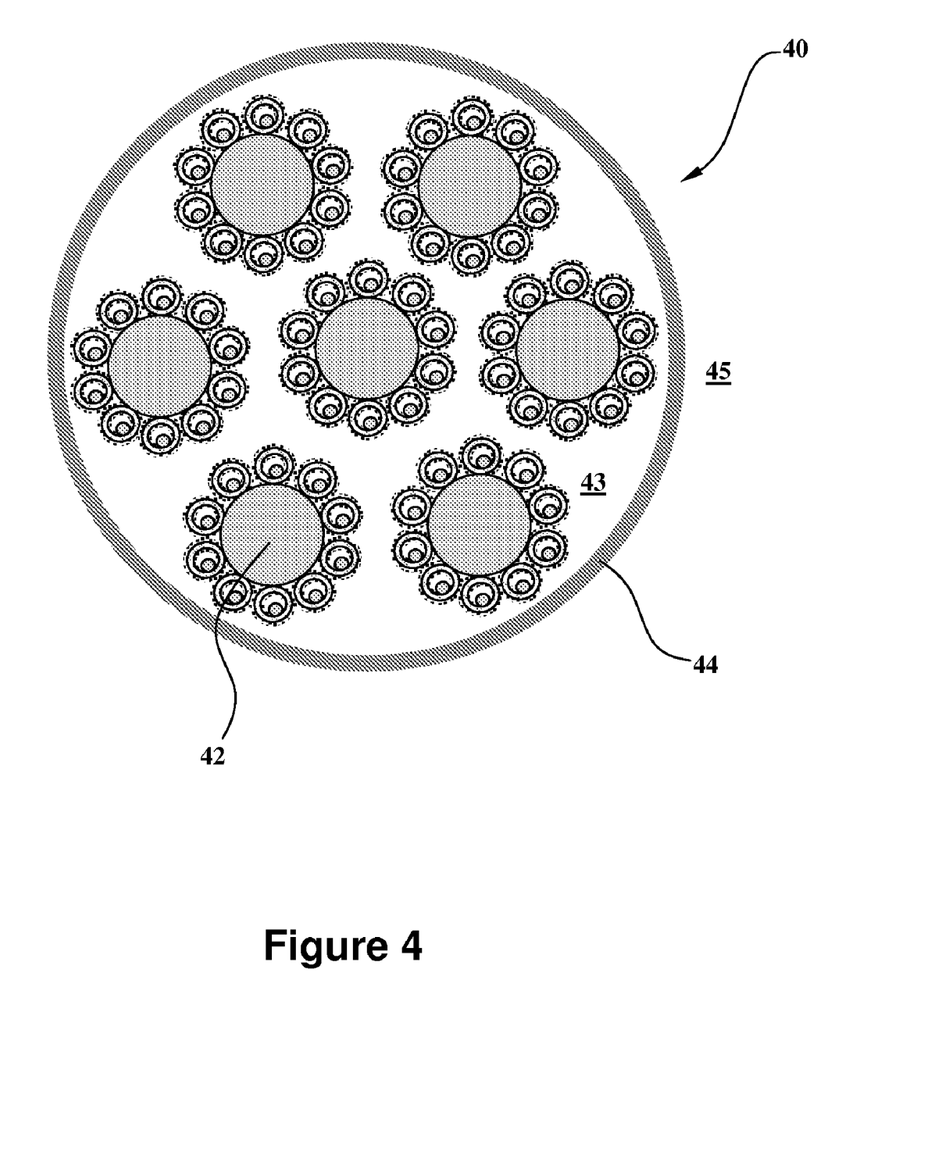
FIG. 4 is a transverse cross-sectional view of a fuel cell bundle comprising a thermally conductive tubular element and multiple fuel cell sub-bundles positioned therein, according to one embodiment of the present invention.

Specifically, FIG. 4 shows the transverse cross-sectional view of an exemplary fuel cell bundle 40, which comprises a thermally conductive tube 44 having a bore side 43 and a shell side 45. Multiple fuel cell sub-bundles 42 are positioned inside the bore 43 and arranged in a heat-transmitting relationship with the wall of such thermally conductive tube 44. In operation, a heat-exchanging fluid is passed through the shell side 45 of the thermally conductive tube 44 to absorb the heat generated by the fuel cell sub-bundles 42 through the tube wall.

The thermally conductive tube 44 as illustrated hereinabove can be formed of any suitable materials that are sufficiently corrosion-resistant for surviving the chemical environment during operation of the fuel cell elements. For example, it may comprise carbon, graphite, carbon fiber- or fiberglass-reinforced composite materials, metals, metal alloys, thermally conductive polymers, polymeric composites, and thermally conductive ceramics that are well known in the art.

In a preferred embodiment of the present invention, the thermally conductive tube comprises carbon, graphite, or carbon fiber- or fiberglass-reinforced composite material.

In an alternative embodiment, such thermally conductive tube comprises metal or metal alloy, including but not limited to: titanium, niobium, nickel, zirconium, gold, tantalum, platinum, palladium, silver, and alloys thereof. A metal clad composite having two or more metal layers bonded together by solid-phase bonding can be used for forming the thermally conductive tube. Specifically, the metal clad composite comprises an innermost layer formed of corrosion-resistant metal or metal alloy, such as titanium, niobium, nickel, zirconium, gold, tantalum, platinum, palladium, silver, and alloys thereof, and one or more outer layers comprising metal or metal alloy of higher conductivity and/or lower costs, such as copper, aluminum, brass, bronze, nickel, silver, and alloys thereof.

In another embodiment, polymeric materials that contain thermally conductive materials and exhibit adequate heat transfer property can be used for forming the thermally conductive tube of the present invention. Suitable polymeric materials include, but are not limited to, thermally conductive polymers, polymer/metal composite materials, polymer/carbon composite materials, and polymer/ceramic composite materials.

The fuel cell sub-bundles 42 can be packed inside the thermally conductive tube in any configuration, without limitation. In a preferred embodiment of the present invention, the fuel cell sub-bundles are assembled into a core structure, which can be inserted into and removed from the thermally conductive tube as a compact unit.

Figure 5A:
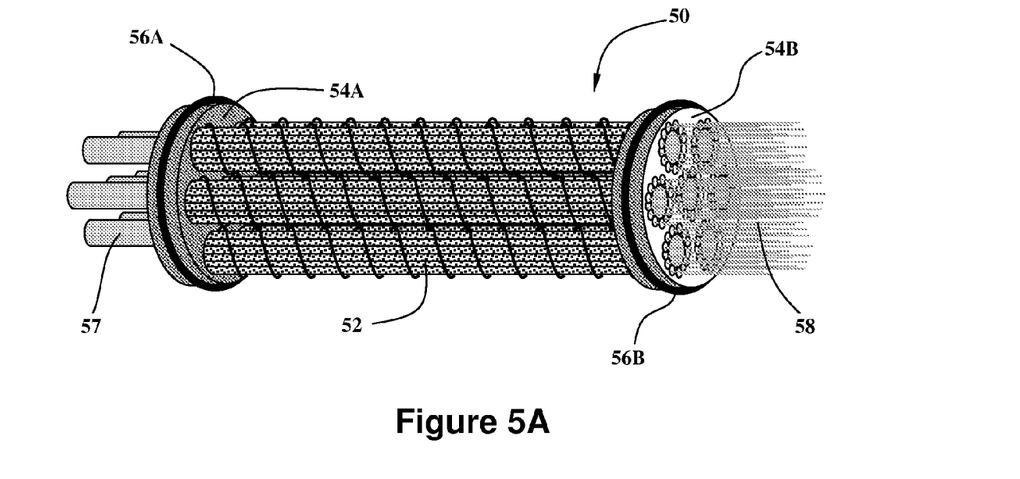
FIGS. 5A and 5B are perspective views of a core element comprising multiple fuel cell sub-bundles, according to one embodiment of the present invention.
Figure 5B:
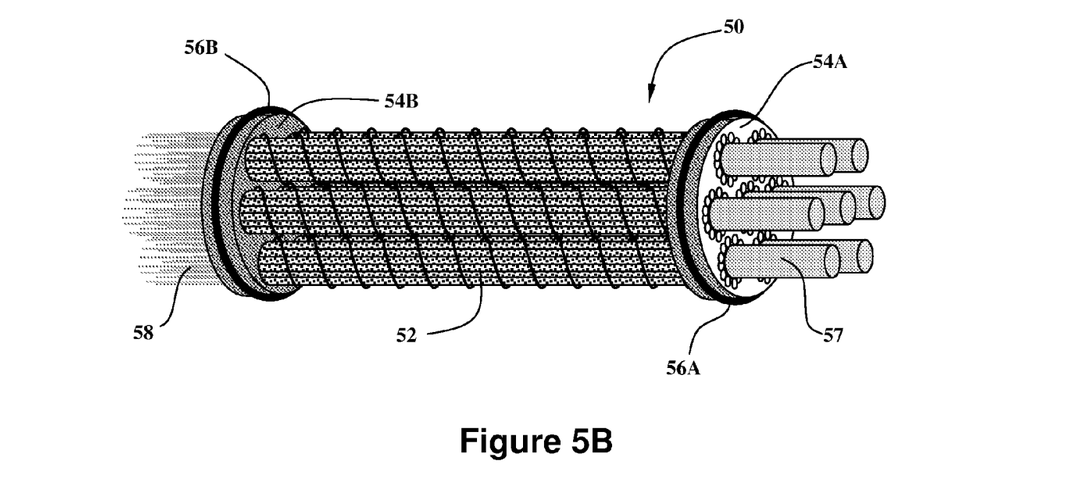

FIGS. 5A and 5B show the perspective view of an exemplary core structure 50, which comprises multiple fuel cell sub-bundles 52 parallelly aligned with one another. Potting members 54A and 54B are provided at both ends of the fuel cell sub-bundles 52 to (1) isolate the shell sides of all the microfibrous fuel cell elements from the bore sides thereof, and (2) bind the fuel cell sub-bundles 52 together into a unitary core structure. As shown in FIGS. 5A and 5B, the microfibrous fuel cell elements have openings on the outer surfaces of the potting members 54A and 54B, and a feed- or oxidant-containing fluid can be introduced into the bores of the microfibrous fuel cell elements through such openings. Optionally, O-ring elements 56A and 56B can be further employed to ensure leak-tight seal of the shell sides from the bore sides.

The current collectors of the multiple fuel cell sub-bundles 52 in this specific embodiment illustrated by FIGS. 5A and 5B are arranged in a configuration particularly suitable for parallel connections thereof. Specifically, all the common current collectors 57 of the fuel cell sub-bundles 52 extend from one end of the core structure 50, while all the individual current collectors 58 extend from the other end of such core structure. Therefore, the multiple fuel cell sub-bundles 52 can be readily connected in parallel, by electrically coupling all the common current collectors 57 with a first terminal (either positive or negative) at one end of the core structure 50 and all the individual current collectors 58 with a second terminal (either negative or positive) at the other end.

Alternatively, the multiple fuel cell sub-bundles may be arranged in a different configuration that is suitable for serial connections. For example, the common current collector of one fuel cell sub-bundle and the individual current collectors of a preceding fuel cell sub-bundle extend from one end of the core structure, while the individual current collectors of such fuel cell sub-bundle and the common current collector of a subsequent fuel cell sub-bundle extend from the other end of the core structure, etc., thereby forming a head-to-tail arrangement. Detachable terminal connectors or terminal elements with built-in coupling wires can be used for connecting such fuel cell sub-bundles in series, consistent with descriptions in U.S. Pat. Nos. 6,399,232, 6,403,248, 6,403,517, 6,444,339, and 6,495,281. Further, a porous insulating layer can be used to cover each fuel cell sub-bundle in this configuration, in order to prevent electrical shorting between adjacent serially connected fuel cell sub-bundles while allowing diffusion of fuel or oxidant fluid therethrough to contact the outer electrocatalyst layer of each microfibrous fuel cell in the sub-bundles.

Figure 6:
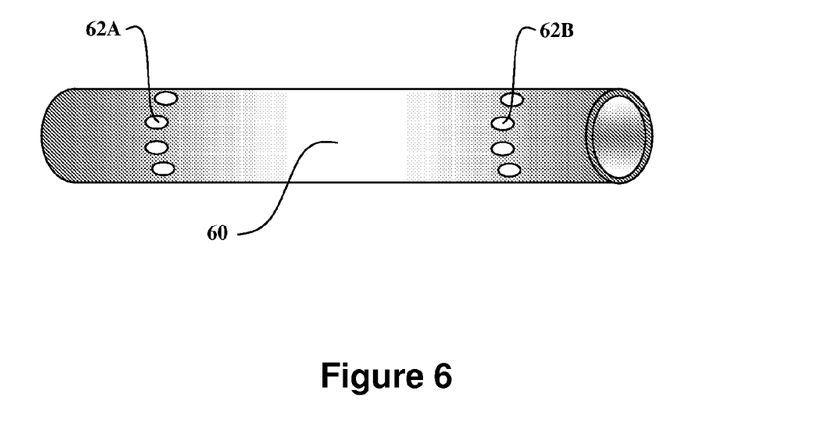
FIG. 6 is a perspective view of a thermally conductive tubular element, into which a core element can be inserted to form a fuel cell bundle, according to one embodiment of the present invention.

FIG. 6 shows a thermally conductive tube 62, into which a core structure can be inserted, according to a specific embodiment of the present invention. The inner diameter of such thermally conductive tube 62 is provided as the same or slightly smaller than the outer diameters of the O-ring elements and/or potting members of the core structure to be inserted thereinto, for the purpose of ensuring leak-tight sealing or mating between the inner surface of the thermally conductive tube 62 and the potting members of core structure inserted therein.

As shown in FIG. 6, the thermally conductive tube 62 is perforated near both ends, and the distance between the first set of perforations 64A and the second set of perforations 64B is smaller than the distance between the two potting members of the core structure to be inserted thereinto. When the core structure is positioned inside such thermally conductive tube 62, the perforations 64A and 64B provide access to the shell sides, but not the bore sides, of the microfibrous fuel cell elements; concurrently, the two open ends of the thermally conductive tube 62 provide access to the bore sides, but not the shell sides, of the microfibrous fuel cell elements.

Figure 7:
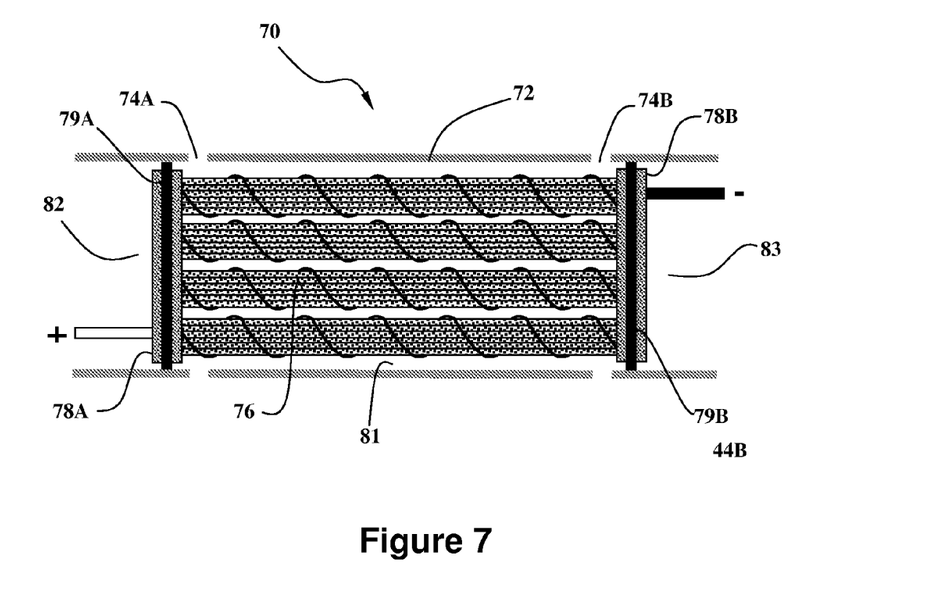
FIG. 7 is a longitudinal cross-sectional view of a fuel cell bundle comprising a thermally conductive tubular element having a core element placed therein, according to one embodiment of the present invention.

FIG. 7 shows the longitudinal cross-sectional view of a fuel cell bundle 70 comprising a thermally conductive tube 72 with a core structure 76 positioned therein, according to one embodiment of the present invention. The potting members 78A, 78B and the O-ring elements 79A, 79B form leak-tight seal with the inner surface of the thermally conductive tube 72 and thereby divide the interior volume of the thermally conductive tube 72 into three sections, including a central section 81, a first end section 82, and a second end section 83.

Perforations 74A and 74B near both ends of the thermally conductive tube 72 communicates with the central section 81, and a fuel-containing or oxidant-containing fluid can therefore be introduced into the central section 81 to feed the shell sides of the microfibrous fuel cell elements contained in the core structure 76. Likewise, the end sections 82 and 83 communicates with the bore sides of the microfibrous fuel cell elements through openings on the respective outer surfaces of the potting members 78A and 78B, and an oxidant-containing or fuel-containing fluid can thus be introduced into the end sections 82 and 83 to feed the bore sides of the microfibrous fuel cell elements.

Although the above-described examples illustrate core structures and fuel cell bundles containing multiple fuel cell sub-bundles therein, it will be appreciated that the core structures and fuel cell bundles of the present invention may comprise a single fuel cell sub-bundle, which are consistent with the general disclosure of this specification and within the broad scope of the present invention.

A further aspect of the present invention relates to a fuel cell bundle that comprises one or more microfibrous fuel cell elements placed in an air channel tube, each microfibrous fuel cell element comprising (a) an inner current collector; (b) a hollow fibrous membrane separator comprising an electrolyte medium; (c) an inner electrocatalyst layer; (d) an outer electrocatalyst layer, and (e) optionally, an outer current collector.

The term "air channel tube" as used herein broadly refers to a tubular structure that can be used for delivery of either oxidant (such as air or oxygen gas) or fuel (such as hydrogen gas or methanol), and such term is therefore not limited to mere delivery of air. Such air channel tube can be manufacturing using any suitable material such as metals, metal alloys, carbon, graphite, carbon fiber- or fiberglass-reinforced composite materials, polymer composite materials, ceramics, etc.

One particular advantage achieved by the present invention is the even and uniform distribution of oxidant (or fuel) throughout the entire system: the oxidant (or the fuel) is uniformly passed through the bore of each air channel tube of each fuel cell bundle, and the microfibrous fuel cells inside each air channel tube are therefore evenly exposed to the oxidant (or the fuel), regardless of the number of fuel cell bundles contained in the system of the present invention.

In a preferred embodiment, such air channel tube is a thermally conductive tube that functions also as a heat exchange tube for transmitting heat generated by the microfibrous fuel cell elements out of the fuel cell bundle. Further, such air channel tube can be a thermally and electrically conductive tube, which can function as both a heat exchange tube and a common outer current collector for the microfibrous fuel cell elements disposed therein. Correspondingly, the microfibrous fuel cell elements can be devoid of additional outer current collectors.

Figure 1A:
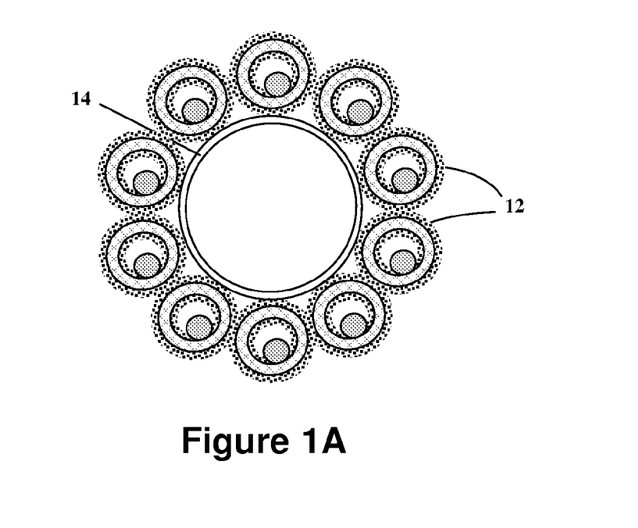
FIG. 1A is a transverse cross-sectional view of a fuel cell sub-bundle wherein the common current collector is in the form of such a thermally and electrically conductive tube.

FIG. 1A is a transverse cross-sectional view of a fuel cell sub-bundle that is identical to the sub-bundle shown in FIG. 1, and numbered consistently therewith, but wherein the common current collector 14 is in the form of such a thermally and electrically conductive tube, as described above.

The thermally and/or electrically conductive tube as used in the present invention can be formed of any suitable materials that are sufficiently corrosion-resistant, which include but are not limited to: carbonaceous materials (such as graphite and carbon), carbon fiber- or fiberglass-reinforced composite materials, metals and metal alloys (such as titanium, niobium, nickel, zirconium, gold, tantalum, platinum, palladium, silver, and combinations thereof), thermally and/or electrically conductive polymers, polymeric composites, and thermally and/or electrically conductive ceramics.

Preferably, such thermally and/or electrically conductive tube comprises a metal clad composite having two or more metal layers bonded together by solid-phase bonding, in which the innermost layer comprises corrosion-resistant metal or metal alloy, such as titanium, niobium, nickel, zirconium, gold, tantalum, platinum, palladium, silver, and combinations thereof, and wherein the outer layer(s) comprises metal or metal alloy of higher conductivity and/or lower costs, such as copper, aluminum, brass, bronze, nickel, silver, and combinations thereof.

In another embodiment of the present invention, such air channel tube is a polymeric tube. Polymeric tubes that are sufficiently thin or are made of polymeric composites containing thermally conductive materials may exhibit adequate heat transfer property and can be used also as heat exchange tubes in the present invention. Preferably, the polymeric tube used herein comprises a membrane wall having a thickness in a range of from about 25 microns to about 1 millimeter, and may be made of a material such as thermally conductive polymers, polymer/metal composite materials, polymer/carbon composite materials, or polymer/ceramic composite materials. Preferably, such polymeric tube comprises a polymeric material of sufficiently high melting point (i.e., >80° C., more preferably >100° C., and most preferably >120° C.), so that such polymeric tube can survive the elevated temperature of the electrochemical reaction environment in the fuel cell bundles.

Further, such polymeric tube may comprise a membrane wall that is non-porous and hydrophilic. When such polymeric tube is immersed in an aqueous heat exchanging solution, water diffuses through its hydrophilic membrane wall into its bore side, thus supplying water vapor into the inner volume of such polymeric tube for humidifying the microfibrous fuel cell elements disposed therein. Polymeric materials specifically suitable for forming such nonporous, hydrophilic membrane wall include, but are not limited to, perfluorosulfonate ionomers, such as the Nafion® membrane material manufactured by DuPont at Fayetteville, N.C.; Flemion® membrane material manufactured by Asahi Glass Company at Tokyo, Japan; Aciplex® membrane material manufactured by Asahi Chemical Company at Osaka, Japan, among which the Nafion® membrane material is the most preferred.

Alternatively, such polymeric tube may comprise a membrane wall that is microporous and hydrophobic. When such polymeric tube is immersed in an aqueous heat exchanging solution, the heat exchanging solution cannot pass through its microporous membrane wall due to the hydrophobicity, while water vapor derived from such aqueous solution can diffuse through the microporous membrane wall into its lumen, to humidify the feed or oxidant stream that passes through the lumen of such polymeric tube.

A thermally conductive polymeric tube with a non-porous, hydrophilic or a microporous, hydrophobic membrane wall is therefore capable of concurrently performing triple functions as an air channel tube, a heat exchange tube, and a humidifier for the microfibrous fuel cell elements disposed therein, and use of which effectively achieves integration of thermal and humidity management.

In a specific embodiment, the air channel tube and the microfibrous fuel cell elements placed therein in are sized for providing three fluid paths through the fuel cell bundle, which including (1) a feed (or oxidant) path at the bore sides of the microfibrous fuel cell elements; (2) an oxidant (or feed) path at the shell sides of the microfibrous fuel cell elements inside the air channel tube; and (3) a heat-exchanging fluid path outside the air channel tube. These three fluid paths are separated from each other by the respective walls of the membrane separators of the microfibrous fell cells and the air channel tube. Preferably, the hollow fibrous membrane separators of the microfibrous fuel cell elements extend beyond the air channel tube at both ends. In such manner, the air channel tube and the membrane separators of the microfibrous fuel cells can be separately potted to seal their respective bore sides from the shell sides, so that fuel (such as hydrogen or methanol), oxidant (such as oxygen), and heat-exchanging fluid can be separately passed through the fuel cell bundle through the above-described three fluid paths.

Fuel Cell Assembly

A still further aspect of the present invention relates to a fuel cell assembly comprising an assembly of the above-described fuel cell bundles, as positioned in a housing that comprises multiple leak-tightly separated compartments and multiple fluid inlets and outlets arranged for separately passing a fuel-containing fluid, an oxidant-containing fluid, and a heat-exchange fluid through the fuel cell bundles for generation of electrical and thermal energy.

Figure 8:
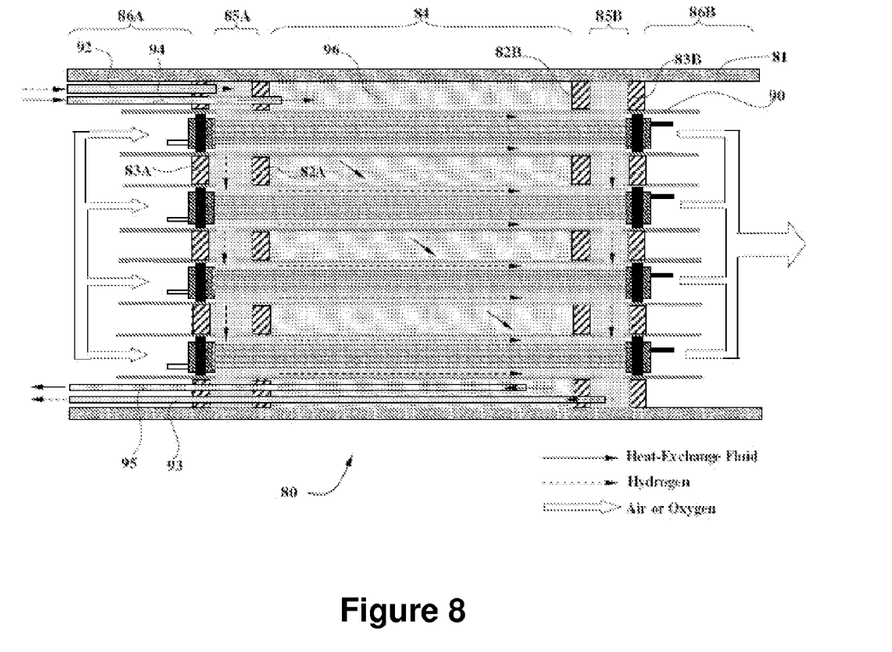
FIG. 8 is a longitudinal cross-sectional view of a fuel cell assembly comprising an assembly of fuel cell bundles positioned in a housing that comprises multiple leak-tightly separated compartments and fluid inlets and outlets for separately passing a fuel-containing fluid, an oxidant-containing fluid, and a heat exchanging fluid through the fuel cell bundles, according to one embodiment of the present invention.

In an exemplary embodiment as shown in FIG. 8, a fuel cell assembly 80 comprises a housing 81 having two open ends and multiple fuel cell bundles 90 disposed therein. Each fuel cell bundle 90 comprises a thermally conductive tube having a core structure inserted therein, as described hereinabove. A first pair of tubesheets 82A, 82B and a second pair of tubesheets 83A, 83B are provided for mounting the fuel cell bundles 90. Further, such tubesheets 82A, 82B, 83A, and 83B are leak-tightly secured to the inner surface of the housing 81, thereby dividing the interior volume of the housing 81 into five separate compartments, which include a central compartment 84, a first intermediate compartment 85A, a second intermediate compartment 85B, a first end compartment 86A, and a second end compartment 86B.

The central compartment 84 defined by the first pair of tubesheets 82A and 82B communicates only with the shell sides of the thermally conductive tubes of the fuel cell bundles 90. The first and second intermediate compartments 85A and 85B communicate with the bore sides of such thermally conductive tubes as well as the shell sides of the microfibrous fuel cell elements disposed therein through perforations near both ends of the thermally conductive tubes. However, such first and second intermediate compartments 85A and 85B are isolated from the bore sides of the microfibrous fuel cell elements by potting members at both ends of the microfibrous fuel cell elements, as described hereinabove. The first and second end compartments 86A and 86B communicate with the bore sides of the microfibrous fuel cells of each fuel cell bundle 90, through openings on the potting members at both ends of the microfibrous fuel cell elements.

Therefore, a heat-exchanging fluid 96 can be introduced into the central compartment 84 and passed through the shell sides of the thermally conductive tubes of the fuel cell bundles 90, to remove heat generated by the microfibrous fuel cell elements placed inside the thermally conductive tubes from the fuel cell bundles 90. The heat-exchanging fluid discharged by such fuel cell assembly is preferably passed through a heat exchanger, so that the thermal energy carried by such heat-exchanging fluid is conveyed to the heat exchanger, which may be either a radiator inside a motor vehicle or a domestic residence, or a water heating system of an industrial facility, or the alike. The heat-exchanging fluid deplete of thermal energy is preferably circulated back into the fuel cell assembly for collection of more heat therefrom.

Moreover, a fuel-containing (or oxidant-containing) fluid can be introduced into the first intermediate compartment 85A for feeding the shell sides of the microfibrous fuel cell elements inside the thermally conductive tubes, and the spent feed can be discharged from the second intermediate compartment 85B. Likewise, an oxidant-containing (or fuel-containing) fluid can be introduced into the first end compartment 86A for feeding the bore sides of the microfibrous fuel cell elements, and the spent feed can be discharge from the second end compartment 86B.

Therefore, the fuel, the oxidant, and the heat-exchanging fluid are separately passed through the fuel cell bundles 90 in the housing 81 for generation of electrical and thermal energy thereby.

The present invention in another aspect provides an improved fluid introduction mechanism, which comprises multiple fluid inlets and outlets that are all parallelly align with the longitudinal axis of the housing 81, for separately introducing multiple fluids into and out of multiple compartments of the housing 81 along directions that are substantially parallel to the longitudinal axis of such housing.

Specifically, a heat-exchanging inlet tube 94 extends through the tubesheets 82A and 83A into the central compartment 84 for introducing a heat-exchanging fluid thereinto, and a corresponding heat-exchanging outlet tube 95 extends out of the central compartment 84 through the tubesheets 82A and 83A for discharging used heat-exchanging fluid out of the housing 81. A fuel (or oxidant) inlet tube 92 extends through the tubesheets 83A into the first intermediate compartment 85A for feeding a fuel-containing (or oxidant-containing) fluid to the shell sides of the microfibrous fuel cell elements, while a corresponding fuel (or oxidant) outlet let tube extends out of the second intermediate compartment 85B through the tubesheets 82B, 82A, and 83A for discharging spent fuel (or oxidant) fluid out of the housing 81. Further, an oxidant (or fuel) is provided in the first end compartment 86A for feeding the bore sides of the microfibrous fuel cell elements, and spent oxidant (or fuel) is discharged out of the housing 81 from the second end compartment 86B, with or without additional inlet and outlet.

All the above-mentioned inlet and outlet tubes are substantially parallel to the longitudinal axis of the housing 81, for introducing fluids into and discharging fluids from the housing 81 along directions that are substantially parallel to its longitudinal axis, as indicated by the arrow heads in FIG. 8. Such parallel configuration of the fluid inlets and outlets enables construction of a fuel cell assembly with no transverse openings on its housing, which can be easily mounted or otherwise incorporated into an energy-consuming system for provision of electrical and thermal energy thereto.

Figure 9:
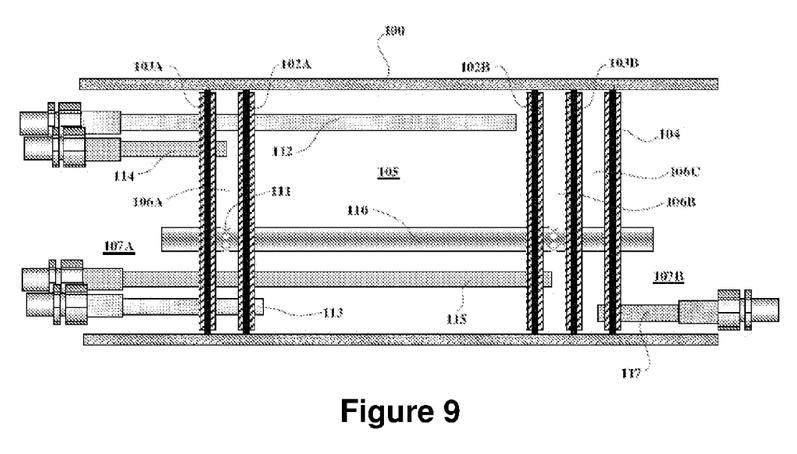
FIG. 9 is a longitudinal cross-section view of a compartmentalized housing with multiple fluid inlets and outlets, which can be used for positioning multiple fuel cell bundles and forming a fuel cell assembly, according to one embodiment of the present invention.

FIG. 9 shows the longitudinal cross-sectional view of another housing 100, which is divided by a first pair of tubesheets 102A and 102B, a second pair of tubesheets 103A and 103B, and a single tube sheets 104 into six leak-tightly separated compartments, including: a central compartment 105, a first intermediate compartment 106A, a second intermediate compartment 106B, an isolation compartment 106C, a first end compartment 107A, and a second end compartment 107B. The isolation compartment 106C is provided herein as an optional safety feature to prevent possible mixture of the fuel (or oxidant) in the second intermediate compartment 106B and the oxidant (or fuel) in the second end compartment 107B in the event of rupture or leakage of the tubesheet 103B.

One fuel cell bundle 110 is illustratively shown in FIG. 9 to demonstrate the relative positions of the tubesheets and compartments with respect to the fuel cell bundle. Specifically, the perforations on the thermally conductive tube of such fuel cell bundle are located in the first and second intermediate compartments 106A and 106B, and the two open ends of the thermally conductive tube of such fuel cell bundle terminate in the first and second end compartments 107A and 107B.

A heat-exchanging inlet tube 113 extends from outside of the housing 100 through the tubesheets 103A and 102A and terminates in the central compartment 105. In contrast, a heat-exchange outlet tube 112 extends from the central compartment 105 through the tubesheets 103A and 102A and terminates outside of the housing 100.

A fuel (or oxidant) inlet tube 114 extends from outside of the housing 100 through the tubesheet 103A and terminates in the first intermediate compartment 106A, while a fuel (or oxidant) outlet tube extends from the second intermediate compartment 106B through the tubesheets 102B, 102A, and 103A and terminates outside of the housing 100.

Additionally, a release tube 117 is provided, which extends from the isolation compartment 106C through the tubesheet 104 and terminates outside of the housing 100. In the event of tubesheet rupture or leakage, the escaped fuel or oxidant first enters the isolation compartment 106C and is immediately discharged out of the housing 100 by the release tube 117, before it can reach a threshold concentration and/or temperature that may result in cell fire or irreversible damage to the cells.

Figure 10:
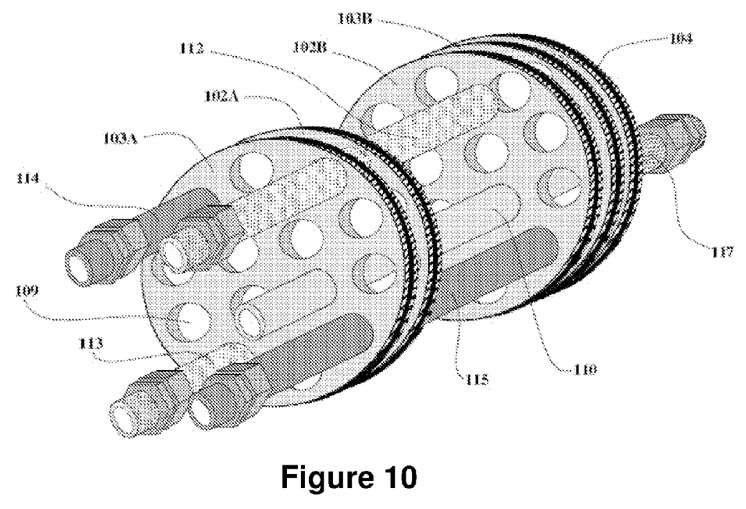
FIG. 10 is a perspective view of various components of the housing in FIG. 9.

FIG. 10 is a perspective view of the tubesheets 102A, 102B, 103A, 103B, and 104, which comprises multiple openings 109 therein sized for mounting the fuel cell bundles 110, the heat-exchanging inlet and outlet tubes 112 and 113, and the fuel (or oxidant) inlet and outlet tubes 114 and 115.

An alternative embodiment of the present invention relates to a fuel cell assembly that comprises multiple fuel cell bundles position in a housing, wherein each fuel cell bundle contains multiple microfibrous fuel cell elements placed inside an air channel tube, as described hereinabove. The housing is compartmentalized for separately passing a fuel, an oxidant, and a heat-exchanging fluid though the fuel cell bundles, consistent with the disclosure hereinabove.

Such fuel cell assembly may further comprise at least one hollow humidifying fiber for each fuel cell bundle. Such hollow humidifying fiber may comprise a nonporous, hydrophilic membrane wall, or a microporous, hydrophobic membrane wall. The humidifying fiber extends through the bore of the air channel tube and opens into the central compartment of the fuel cell assembly, which is preferably filled with an aqueous heat-exchanging fluid. Water derived from such aqueous heat-exchanging fluid flows in the bore of the humidifying fiber and through the inner volume of the air channel tube, therefore providing water vapor for humidifying the oxidant (or the fuel) and the microfibrous fuel cell elements inside such air channel tube.

The humidifying fibers of the present invention may comprise a hydrophilic polymeric material, such as the Nafion® membrane material manufactured by DuPont at Fayetteville, N.C. and fabricated by Microcell Corporation, or a microporous, hydrophobic polymeric material, such as polysulfone membrane material manufactured by Amersham Biosciences, Piscataway, N.J. (such polysulfone membrane material can be further treated with hydrophobicity-imparting materials, to further enhance the hydrophobicity thereof).

When a portion of water in the aqueous heat-exchanging solution is used for humidifying the microfibrous fuel cell elements in the fuel cell assembly, it is necessary to supply water to the heat-exchanging solution to compensate for the water consumed by the microfibrous fuel cell elements.

One preferred embodiment of the present invention therefore collects water generated by the electrochemical reaction in the microfibrous fuel cells, and uses it as water supply for the heat-exchanging circuitry.

While the invention has been described herein with reference to specific embodiments, features and aspects, it will be recognized that the invention is not thus limited, but rather extends in utility to other modifications, variations, applications, and embodiments, and accordingly all such other modifications, variations, applications, and embodiments are to be regarded as being within the spirit and scope of the invention.

What is claimed is:
1. A fuel cell assembly, comprising:
a plurality of fuel cell bundles arranged in longitudinally extending orientation in a housing;
each fuel cell bundle comprising a multiplicity of microfibrous fuel cells arranged in longitudinally extending orientation in the fuel cell bundle, in a multiplicity of fuel cell sub-bundle structures each comprising multiple microfibrous fuel cells circumferentially arranged around a central member comprising a common current collector or hollow tube;

each microfibrous fuel cell comprising an inner current collector and a membrane surrounding the inner current collector and each microfibrous fuel cell of a sub-bundle in contact at an outer surface with the outer common current collector or hollow tube of the sub-bundle, thereby defining bore and shell sides of the microfibrous fuel cells;

each fuel cell bundle including seal members providing fluid communication with the bore sides of the microfibrous fuel cells and separate fluid communication with the shell sides of the microfibrous fuel cells;

wherein the housing is compartmentalized by compartment-forming members arranged to define leak-tightly separated compartments in the housing including a central compartment, first and second intermediate compartments, and first and second end compartments;

multiple fluid inlets and outlets in communication with the housing arranged for separately passing fuel-containing fluid, oxidant-containing fluid and heat exchange fluid through respective ones of the central, intermediate and end compartments and through the fuel cell bundles; and the fuel cell bundles being arranged in relation to the compartment forming members for passing the fuel-containing fluid through one of the bore and shell sides of the microfibrous fuel cells and separately passing the oxidant-containing fluid through the other of the bore and shell sides of the microfibrous fuel cells.

2. The fuel cell assembly of claim 1, wherein the inner current collector in each said microfibrous fuel cells comprises a metal clad composite structure including layers of copper, titanium and niobium.

3. The fuel cell assembly of claim 1, wherein a wrapping element is wound around the multiple microfibrous fuel cells circumferentially arranged around each said central member.

4. The fuel cell assembly of claim 1, wherein sub-bundles in said assembly are electrically coupled in series with one another.

5. The fuel cell assembly of claim 1, wherein sub-bundles in said assembly are electrically coupled in parallel with one another.

6. The fuel cell assembly of claim 1, wherein the multiple microfibrous fuel cells in each of said sub-bundle structures are electrically parallelly interconnected with one another.

7. The fuel cell assembly of claim 1, wherein each microfibrous fuel cell further comprises an inner electrocatalyst layer and an outer electrocatalyst layer.

8. The fuel cell assembly of claim 1, wherein the central member in each sub-bundle is a heat-exchanging element.

9. A fuel cell assembly comprising an elongated housing structure having a longitudinal axis with a multiplicity of fuel cell sub-bundles therein, each of said fuel cell sub-bundles comprising a multiplicity of fuel cell elements, wherein each fuel cell element comprises a membrane separator separating an inner electrocatalyst layer from an outer electrocatalyst layer, wherein the inner electrocatalyst layer is in electrical contact with an individual current collector and the outer electrocatalyst layer is in electrical contact with a common current collector of the sub-bundle, wherein the common current collector is in electrical contact with the outer electrocatalyst layer of all fuel cell elements of the sub-bundle, and wherein said elongated housing structure comprises multiple fluid inlets and outlets for separately passing two or more fluids through the fuel cell elements, and wherein all the fluid inlets and outlets of said elongated housing structure are substantially parallel to the longitudinal axis of said elongated housing.

* * * * *